(12) United States Patent
Omura

(10) Patent No.: US 6,627,244 B2
(45) Date of Patent: Sep. 30, 2003

(54) GREEN TEA COMPOSITION AND MOLDING MATTER THEREOF, AND PROCESS FOR PRODUCING THEM

(75) Inventor: Teijiro Omura, Shizuoka (JP)

(73) Assignee: Jinseido Company, Limited, Shizuoka (JP)

( * ) Notice: Subject to any disclaimer, the term of this patent is extended or adjusted under 35 U.S.C. 154(b) by 59 days.

(21) Appl. No.: 09/843,156

(22) Filed: Apr. 26, 2001

(65) Prior Publication Data

US 2002/0028281 A1 Mar. 7, 2002

(30) Foreign Application Priority Data

Apr. 27, 2000 (JP) ........................................ 2000-126938
Apr. 27, 2000 (JP) ........................................ 2000-126941

(51) Int. Cl.$^7$ .................................................. A23F 3/00
(52) U.S. Cl. ........................ 426/597; 426/456; 426/512
(58) Field of Search ................................ 426/597, 456, 426/512

(56) References Cited

U.S. PATENT DOCUMENTS 5,576,303 A * 11/1996 Shibuya et al.
6,254,912 B1 * 7/2001 Takeuchi et al.

FOREIGN PATENT DOCUMENTS

| CN | 1105525 | 7/1995 |
| EP | 0951839 | 10/1999 |
| EP | 0983727 | 3/2000 |
| JP | 59173054 | * 9/1984 |
| JP | 11139981 | 5/1990 |
| JP | 10210932 | 8/1998 |

OTHER PUBLICATIONS

Kohrin Techno–Books (18), Chemistry of Discoloration of Foods, authored and edited by Susumu Kimura, Toshiro Nakabayashi, and Hiromichi KATO and published by Kohrin Limited on Oct. 30, 1995, cover page and pp. 1, 70–71, 80–89, 159, 166–173, 180–183, with English translation.

"Shizuoka Prefectue Regulations for Guidance on Tea Leaf Production", Regulation 8, Mar. 30, 1956, with English translation.

Patent Abstracts of Japan of JP10210932 dated Aug. 11, 1998.

Database WPI, Derwent Publications Ltd. No. XP002206953 of JP 11 139981 dated May 25, 1999.

Database WPI, Derwent Publications Ltd. No. XP002206745 of CN 1105525 dated Jul. 26, 1995.

\* cited by examiner

Primary Examiner—Anthony J. Weier
(74) Attorney, Agent, or Firm—Ladas & Parry

(57) ABSTRACT

A green tea composition comprising 100 parts by weight of green tea leaf, and 0.01 to 30 parts by weight of trehalose; a process for producing a green tea composition, comprising the steps of heat-treating fresh tea leaf, drying the heat-treated leaf, and crushing the dried leaf, wherein the fresh leaf is brought into contact with trehalose before or after or simultaneously with the heat treatment of the fresh leaf; a molding matter of a green tea composition, obtained by molding a green tea composition comprising 35 to 80% by weight of granulated or powdered green tea (component (A)), 10 to 60% by weight of maltose (component (B)), and 1 to 20% by weight of trehalose (component (C)); and a process for producing a molding matter of a green tea composition, comprising the step of molding the above green tea composition.

5 Claims, No Drawings

GREEN TEA COMPOSITION AND MOLDING MATTER THEREOF, AND PROCESS FOR PRODUCING THEM

BACKGROUND OF THE INVENTION

1. Field of the Invention

The present invention relates not only to green tea compositions and molding matter thereof that retain the taste and the color characteristic of green tea after fresh green tea leaves have been treated with heat and trehalose for the prevention of oxidatio and discoloration and that can fully exhibit the pharmacological effects of catechins and chlorophylls by retaining them at high concentrations, but also to the methods of producing them.

2. Background Art

A recent report has attracted particular attention that catechins contained in green tea have various pharmacological effects, that is, an antioxidant effect for preventing aging, an antimicrobial, antiviral effect, a blood-cholesterol-controlling effect, an anti-vassopressor effect, a hypoglycemic effect, an antidiabetic effect, a platelet aggregation inhibitory effect, a thrombus formation preventing effect, an antineoplastic effect, and an anticarcinogenic effect.

However, the catechins in green tea are converted to brownish substances after undergoing non-enzymatic oxidation although they are converted to theaflavins and other orange-red substances to show bright colors by enzymatic oxidation when green tea leaves are oxidized to black tea by fermentation. This explains a reason that green tea itself is discolored or remains yellowish when hot water is poured on.

Particularly, when left under relatively highly humid conditions, green tea leaves are gradually discolored to brown by the acceleration of non-enzymatic oxidation. Since this discoloration to brown means a decrease in the contents of catechins and chlorophylls, the pharmacological effects of catechins and chlorophylls can hardly be expected of discolored green tea.

Conventionally green teas, mainly sencha (middle-grade green tea) and gyokuro (refined green tea) generally go through the complicated manufacturing processes as described below before they are marketed as final finished products (shiagecha): green tea leaves whose moisture content is 78% by weight are procesed to an intermediate product named aracha (crud tea) whose moisture content is 5% by weight, and then to a final product after sieving and cutting with a cutter.

Green Tea Manufacturing Process

Fresh tea leaf (moisture content: 78% by weight)→(1) steam heat process (for 0.5~1.0 minute)—steamed leaf (moisture content: 78% by weight)→(2) rough rolling process (for 40~45 minutes)—roughly rolled leaf (moisture content: 50% by weight)→(3) second rolling process (for 15~20 minutes)—rolled leaf (moisture content: 50% by weight)→(4) medium rolling process (for 30~40 minutes)—medium rolled leaf→(5) final rolling process (30~40 minutes)—final rolled leaf (moisture content: 12% by weight)→(6) drying process (10~20 minutes)—aracha (crude tea) (moisture content: 5%by weight)

On the other hand, matcha (powdered green tea) is generally made from soft shoots after going through the simplified manufacturing processes as shown below:

Matcha Manufacturing Process

Fresh tea leaf→(1) steam heat process→(2) drying process→(3) powdering process (cutting, sieving, and grinding)→matcha In the above proceses of manufacturing green tea and matcha, it is essential to go through the heat treatment process, such as the steam heat process, through which the enzymes in fresh tea leaves can be inactivated and grassy-smell of fresh leaves can be removed.

Therefore, catechins and chlorophylls can remain in green tea without undergoing a significant change only when fresh leaves are subjected to heat treatment, such as steaming. Green tea can thus assume a green color.

Again, fukamushicha (thoroughly steamed tea), obtained by subjecting fresh tea leaves to heat treatment, such as steaming, two or three times longer than usual, can be rendered comparatively deep green by extracting chloroplasts that sprang out of slightly destroyed tea leaf cells.

Problems this Invention Tries to Solve

In the case of green tea leaves after steam heat treatment, however, the chlorophyllase in the tea leaves are completely inactivated. Since moisture is further removed after respective later processes that last over many hours, normal oxidation takes place more easily, accompanied by a phenomenon in which the chlorophyll (blue green) contained in the green tea is oxidized to brownish phaeophytin, with the green tea gradually discolored to yellow over time.

In addition, oxidation of other components, including amino acids and catechins, takes place simultaneously with the oxidation of chlorophylls. Those components, such as amino acids and catechins, are lost simultaneously by oxidation.

However, green tea, as in sencha or gyokuro, large in particle size, is not discolored so easily as powdered ones. Particularly in the case of finely powdered matcha and granular green tea, they are vulnerable to oxidation and readily absorb moisture because of their surface areas rendered larger after they have been powdered even if they are manufactured in a short time by the simplified process described above as in matcha. They are therefore prone to undergo oxidative degadation. It was therefore found difficult to preservegreen tea intact for a long time as a deep green one after it has benprocessed into powder or granules.

The tea leaves degenerated by oxidation as described above had to be sold at low prices since the degeneration of green leaves can easily be discerned even by non-professionals from the surface color of tea leaves, and the color, aroma, and taste of tea drawn with hot water.

Such being the case, commercially available powdered green teas have a green color index number of less than 900 even immediately after production, and are mostly discolored to a green color index number of less than 700 when stored for two months after production. Those powdered green teas can hardly be called "green teas". Moreover, the pharmacological effects of catechins which should have been contained in green tea originally cannot be expected fully of the discolored teas.

On the other hand, it is impossible to mold green tea into various shapes, such as tablets, after it (green tea) has been powdered or granulated unless a molding aid, such as maltose, is blended in an mount greater (70% by weight or more) than green tea components (30% by weight or less). This is because green tea is as low in water content as 3 to 5% by weight. This means that green tea is extremely dry and lacks viscosity so much so that it is difficult to have the green tea maintain its molded shape even if it has been placed in a metal mold and molded under high pressure with the addition of a molding aid, such as maltose.

Usually green tea, generally bar-like, powdered or granulated, is scooped up with a spoon into a teapot or packed separately in a paper bag for putting in a teapot.

However, it is very difficult to weigh and separately pack green tea as it is bar-like, powdered or granulated into paper bags although green tea packed in a paper bag is can be conveniently used. Because of the poor fluidity of green tea in the form of a bar, powder or a granule, it was very difficult or rather impossible to improve packing efficiency in commercial production.

SUMMARY OF THE INVENTION

After making stgrenuous researches in how to solve the above problems, the inventor has acquired an expertise in which green tea, even if it is powdered or granulated and has a large surface area, can be prevented not only from oxidation but also from discoloration after a prolonged storage with the addition of a specific compound to it. At the same time, the inventor has acquired another expertise in which green tea, powdered or granulated, can be molded when it is blended further with a comparatively small amount of maltose after blending with a specific amount of trehalose. Based on the above expertises, the present invention has been materialized.

Namely, the green tea composition, the first invention of the present invention, is comprising 100 parts by weight of green tea leaf, and 0.01 to 30 parts by weight of trehalose.

Again, the processes for producing the green tea composition, the second invention of the present invention, are comprising the steps of heat-treating fresh tea leaf, drying the heat-treated leaf, and crushing the dried leaf, wherein the fresh leaf is brought into contact with trehalose before or after or simultaneously with the heat treatment of the fresh leaf.

The molding matter of the green tea composition, the third invention of the present invention, is obtained by molding a green tea composition comprising the following components (A), (B) and (C):

component (A): from 35 to 80% by weight of granulated or powdered green tea, component (B): from 10 to 60% by weight of maltose, and component (C): from 1 to 20% by weight of trehalose.

A processes for producing a molding matter of a green tea composition, a fourth invention of the present invention, comprising the step of molding a green tea composition that comprises the following components (A), (B) and (C):

component (A): from 35 to 80% by weight of granulated or powdered green tea, component (B): from 10 to 60% by weight of maltose, and component (C): from 1 to 20% by weight of trehalose.

DETAILED DESCRIPTION OF THE INVENTION

[I] Green Tea Composition
(1) Components:
(A) Green tea leaves

Green tea leaves, used as the component of the green tea composition of the present invention, are either steamed ones obtained by steaming fresh tea leaves plucked from tea plants by hand or with shears or mechanical harvesting equipment, or green tea leaves obtained by parching fresh tea leaves, plucked by either of the above means, in a kiln or a similar device.

After green tea leaves have been brought into contact with trehalose to be described later, they are dried, and then powdered or granulated for use as green tea, powdered or granulated. Specifically, the powdered or granulated green tea includes dried green tea obtained by rolling and drying steamed tea leaves, or matcha obtained by drying and powdering the steamed tea leaves by cutting, sieving, and crushing, or dried green tea, powdered or granulated, obtained by parching fresh tea leaves in a kiln or the like to dry, and powdering or granulating the dried ones.

(B) Trehalose

Trehalose, another component of the green tea composition of the present invention, is one of the disaccharides, a compound with two molecules of D-glucose bonded together with their reducing groups.

Trehalsoe has three different isomers, $\alpha,\alpha$-isomer (mycose, mycoside, and mushroom sugar), $\alpha,\beta$-isomer (neotrehalose), and $\beta,\beta$-isomer (isotrehalose), depending on whether they are $\alpha$-bonded or $\beta$-bonded. Generally, the $\alpha,\alpha$-isomer occurring in nature is used.

Trehalose is a rhombic columnar crytalline solid having a melting point of 97° C. Since it is soluble in water, sparingly soluble in hot ethanol, and insoluble in ether, it is generally used as an aqueous solution.

Although trehalose was formely produced from yeast by extraction, trehalose produced directly from starch is now sold commercially by Hayashibara Comapny, Ltd. under the trade name of "TREHA™". The use of this trehalose is therefore recommended.

When trehalose above-described is used as an aqueous solution, it is customary to prepare an aqueous solution of trehalose consisting of 5 to 50%, preferably 10 to 40%, and more desirably 20 to 30% by weight of trehalose.

(C) Optional Components

The green tea composition of the present invention is composed of the above essential components. However, besides the above components, other components, blended with ordinary green tea as optional ones, can be incorporated into the green tea composition of the present invention within a limit that will not prevent the effects of the invention significantly.

Those optional components include, for example, a pH adjustor, specifically sodium carbonate. The pH adjustor controls the pH of an aqueous solution of trehalose. The aqueous solution of trehalsoe, when adjusted approximately to 7.5 (weak base), can quickly migrate to the inside of tea leaf tissues.

(2) Blending
(A) Blending Ratio

Green tea leaves and trehalose, the essential ingredients of the green tea composition of the present invention, are blended in such a manner that the amount of trehalose is 0.01 to 30 parts, preferably 0.1 to 10 parts, and more desirably 1 to 5 parts by weight against 100 parts by weight of dried green tea leaves.

(B) Method of Blending

Various methods can be adopted of blending the above-described green tea leaves and trehalose, because it is enough to simply bring the two components into contact with each other. In general, the two components are blended by one of the following methods: a method in which tea leaves, steam heat-treated or parched, are immersed in an aqueous solution of trehalose, a method in which fresh tea leaves are brought into contact with heating steam in which trehalose is mixed, and a method in which fresh tea leaves, after immersing in an aqueous solution of trehalose, are brought into contact with heated steam.

This contact process enables to prevent the discoloration of green tea leaves due to the oxidation of active components contained in the green tea leaves, such as catechins and chlorophylls.

(3) Properties
(A) Green Color Index Number

Generally, fresh tea leaves after heat treatment, such as steaming, are non-fermented ones with their green color retained by preventing enzymatic oxidation, because the enzymes contained in them are inactivated by the above heat treatment.

Generally, the chlorophyll oxidase, chlorophyllase, of the tea leaves heated-treated as above is completely inactivated. In addition, the tea leaves, heated and dehydrated in the subsequent processes over many hours, are normally oxidized more readily, and gradually discolored to yellow, as seen in chlorophylls (blue green) contained in them oxidized to phaeophytin (brownish).

In the present invention, however, it becomes possible to prevent the discoloration of green tea leaves, induced by the oxidation of such active components as catechins and chloropylls contained in green tea leaves by bringing the green tea leaves into contact with trehalose.

The reason for the fact that green tea leaves can be prevented from discoloring due to the oxidation of active components, such as catechins and chlorophylls, in the green tea leaves by bringing the green tea leaves into contact with trehalose as above-described is still left unclarified. The inventor opines, however, that oxidation-induced discoloration can be prevented either by including the active components in the green tea leaves by the clathrate action of trehalose thus to shield them from the air or by allowing the water retained in the tissues of the green tea leaves to contain trehalose so that the viscosity of the retained water can be increased to prevent the migration of the retained water.

Accordingly, the green tea composition of the present invention with oxidation-induced deteriration prevented can generally have a green color index of 900 to 1000 as measured by the digital color sensor, preferably 930 to 990, and more desirably 950 to 990.

(B) Particle Size

The green tea composition of the present invention is generally presented as sencha or gyokuro. However, the above-described effect of preventing discoloration by preventing oxidative deterioration is notable when the green tea is granulated or powdered one having a particle size of generally not more than 16 meshes (sieve opening: approximately 1 mm or less), preferably from 32 to 200 meshes (sieve opening: approximately 0.5 to 0.07 mm), particularly from 60 to 100 meshes (sieve opening: approximately 0.25 to 0.15 mm).

In general, green teas called sencha and gyokuro do not easily discolor as compared with powdered teas. As to powdered green teas, even if they have been produced in a short time by a simplified process as mentioned previously, they inevitably have increased surface areas, so that they readily undergo oxidation and absorb water. For this reason, powdered green teas suffer oxidative deterioration more easily than sencha and gyokuro.

Conventional granulated or powdered green teas that have been preserved for two months after production have lowered green color index numbers of less than 700. According to the present invention, on the other hand, since tea leaf and trehalose are brought into contact with each other as described above, the green color index number of the resulting granulated or powdered green tea, which is from 900 to 1,000, preferably from 930 to 990, particularly from 950 to 990 when measured with a digital color sensor right after production, is maintained as high as 700 or more, preferably 800 or more, more preferably 900 or more, particularly 930 or more even if it is preserved for two months.

(4) Applications

The above-described green tea composition of the invention can be made into molding matter in a variety of shapes. To make the green tea composition into molding matter, it is essential to add proper amounts of maltose (component (B)) and trehalose (component (C)) to the green tea composition.

[II] Molding Matter of Green Tea Composition (1) Components (A) Component (A): Granulated or Powdered Green Tea (a) Green Tea Any granulated or powdered green tea can be used as component (A) of a molding matter of a green tea composition of the present invention, as long as it is green tea obtained by heat-treating fresh leaf, drying the heat-treated leaf, and granulating or powdering the dried leaf. In general, however, it is preferable to use, as component (A), a green tea composition produced via the previously mentioned treatment designed to prevent oxidative deterioration of the green tea to preserve its green color.

(b) Green Color Index Number

It is preferable to use, as component (A), a green tea composition whose green color index number measured with a digital color sensor is generally from 900 to 1,000, preferably from 930 to 990, particularly 950 to 990.

In the case of conventional powdered green teas, even if they have been produced in a short time by a simplified process, they have increased surface areas, so that they tend to suffer oxidation and to absorb water. Such powdered green teas thus undergo oxidative deterioration very quickly. On the other hand, in the course of the production of a green tea composition, which is favorably used as component (A), fresh leaf is brought into contact with trehalose to impregnate the leaf with the trehalose. Therefore, the resulting powdered green tea scarcely discolors even if its particle size is very small.

In general, conventional powdered green tea made from fresh leaf having a green color index number of 1,000 has a lowered green color index number of less than 700 after it is preserved for two months. In the present invention, however, since tea leaf and trehalose are brought into contact with each other as mentioned above, the resulting green tea composition whose green color index number measured with a digital color sensor right after production is generally from 900 to 1,000, preferably from 930 to 990, particularly from 950 to 990, can maintain its green color index number as high as 700 or more, preferably 800 or more, more preferably 900 or more, particularly 930 or more even after it is preserved for two months.

(c) Granule or Powder

In the present invention, granulated or powdered green tea having a particle size of generally not more than 16 meshes (sieve opening: approximately 1 mm or less), preferably from 32 to 200 meshes (sieve opening: approximately 0.5 to 0.07 mm), particularly from 60 to 100 meshes (sieve opening: approximately 0.25 to 0.15 mm) is used as component (A) of a molding matter of a green tea composition. The discoloration-preventing effect of trehalose is notable when the particle size of the granulated or powdered green tea falls within the above-described range.

(B) Component (B): Maltose

Maltose that is used as component (B) of a molding matter of a green tea composition of the present invention is saccharide composed of two pyranose-type D-glucose molecules that are bonded together through a-1,4-bonding. In the present invention, it is preferable to use as component (B) reducing maltose having a free aldehyde or ketone radical.

In the case where saccharide other than maltose, such as fructose or lactose, is used instead of maltose, it is necessary to use the saccharide in an increased amount and the green tea in a decreased amount in order to impart sufficiently high shape retention to the resulting compact. If such saccharide is used in an increased amount, the resulting molding matter gives unfavorable sweetness and taste, and cannot give the taste characteristic of green tea.

(C) Component (C): Trehalose

The trehalose that has been used to prepare the aforementioned green tea composition is used as component (C), which is added to the granulated or powdered green tea, component (A), in order to prevent the green tea from undergoing oxidative deterioration, thereby preserving the green color of the green tea, and to impart increased shape retention to the resulting molding matter.

In a molding matter of a green tea composition into which trehalose, component (C), has been incorporated, the green tea and the trehalose are in contact with each other, so that the green tea itself is prevented from undergoing oxidation. The molding matter is thus prevented from discoloration, and can preserve its green color. In addition, the trehalose can also prevent catechins and chlorophylls contained in the green tea from any change. To obtain these effects, a predetermined amount of trehalose is incorporated into a molding matter of a green tea composition.

The incorporation of trehalose can be conducted by one of the following methods:

(1) a method in which trehalose is added to the powdered green tea in the course of its production;

(2) a method in which trehalose is added to components (A) and (B), and the mixture is made into a compact; and (3) a method in which a part of a predetermined amount of trehalose is added to the powdered green tea in the course of its production, and the remaining part of the trehalose is added to the components of a molding matter.

Of these, methods (1) and (3) are preferred, and method (1) is particularly preferred. In the case of the above method (1), it is particularly preferable that trehalose be added when fresh leaf is subjected to heat treatment, or that steamed leaf be treated with trehalose right after the steaming step.

Trehalose Treatment

In general, when fresh leaf plucked by hand, or with shears or mechanical harvesting equipment is subjected to heat treatment, that is, steaming in a steamer or firing in a kiln, the enzymes contained in the fresh leaf are inactivated, and the grassy smell of the fresh leaf is eliminated. Moreover, the fresh leaf is evenly and uniformly softened, so that it becomes easy to conduct the subsequent rolling step.

Chlorophyllase (chlorophyll esterase) contained in fresh leaf is completely inactivated while the leaf is steamed or fired, so that the leaf does not undergo enzymatic oxidation. However, heat is applied to the steamed or fired leaf, and moisture is removed from the leaf in the subsequent steps that are effected over many hours, so that non-enzymatic oxidation tends to occur in these steps. Chlorophylls (blue-green) contained in the green tea leaf therefore suffer oxidation, and change to phaeophytin (brownish); the tea leaf thus gradually undergoes yellowing. The treatment with trehalose is conducted in order to prevent this change in color of tea leaf.

The trehalose treatment in which green tea leaf and trehalose are brought into contact with each other may be carried out before or after or simultaneously with the heat treatment of tea leaf. The green tea leaf can thus be impregnated with trehalose.

A molding matter of a green tea composition containing trehalose, component (C), has the following advantage: since the trehalose covers the green tea to prevent it from oxidation, the green tea composition is prevented from undergoing discoloration, and can thus preserve its green color. Moreover, the trehalose can also prevent catechins and chlorophylls contained in the green tea from undergoing any change.

When fresh leaf is subjected to the heat treatment, the enzymes contained in the leaf are inactivated, so that the active substances contained in the leaf do not undergo enzymatic oxidation. Therefore, the tea leaf obtained via the heat treatment is non-fermented tea that can preserve its green color for a long period of time.

The powdered green tea obtained via the above-described heat treatment that is effective to prevent the green tea from oxidative deterioration generally has a green color index number measured with a digital color sensor of 900 to 1,000, preferably 930 to 990, particularly 950 to 990.

Furthermore, a molding matter of a green tea composition into which trehalose has been incorporated has increased shape retention. The reason why trehalose can impart increased shape retention to the resulting molding matter has not yet been clarified. It is however considered that, when pressure is applied to the powdered green tea in the presence of trehalose and maltose, the trehalose and maltose are fused to each other to promote the physical integrity of the resulting molding matter.

(D) Other Components (Optional Components)

In addition to the above-described essential components, other components may optionally be added to the green tea composition within such a limit that the effects of the present invention are not remarkably marred.

Carboxymethyl Cellulose Salts

Specific examples of carboxymethyl cellulose salts that can be used to impart, for instance, improved solubility to the resulting molding matter include calcium carboxymethyl cellulose, magnesium carboxymethyl cellulose, sodium carboxymethyl cellulose, and potassium carboxymethyl cellulose. Of these, calcium carboxymethyl cellulose is preferably used in the present invention. In general, it is preferable to incorporate the above carboxymethyl cellulose salt in an amount of 0.01 to 0.05% by weight of the green tea composition.

Lubricants

It is preferable to add a lubricant to a green tea composition of the invention to make it easy to shape the green tea composition into a molding matter. Specific examples of lubricants that can be used in the present invention include sucrose fatty acid esters, finely divided silicon disulfide, and hardened rapeseed oil. It is preferable that the lubricant be added in an amount of generally about 0.2 to 8.0 parts by weight, particularly about 1.0 to 5.0 parts by weight for 100 parts by weight of the green tea composition.

(2) Formulation

To obtain a green tea composition that will be made into a molding matter, 35 to 80% by weight, preferably 45 to 70% by weight, particularly 55 to 65% by weight of the granulated or powdered green tea is blended with 10 to 60% by weight, preferably 20 to 50% by weight, particularly 30 to 40% by weight of reducing maltose, and 1 to 20% by weight, preferably 3 to 15% by weight, particularly 5 to 10% by weight of trehalose.

When the percentage of the maltose is too low, the green tea composition cannot be made into a molding matter; or even if a molding matter can be obtained, it is readily collapsed even by a weak force. On the other hand, when the percentage of the maltose is too high, the resulting molding matter predominantly gives the sweetness of the maltose, and cannot give the taste characteristic of green tea. When the percentage of the trehalose is too low, the resulting molding matter cannot retain its shape. On the other hand, when the percentage of the trehalose is too high, the resulting molding matter becomes too sweet, and cannot give the taste characteristic of green tea.

(3) Process for Blending

To incorporate trehalose and maltose into a green tea composition, it is enough to simply blend the above-described green tea component with trehalose and maltose. It is however preferable that the green tea component be firstly blended with trehalose, and then with maltose. This is because trehalose can prevent the discoloration of the green tea. The reason why the discoloration of the green tea can be prevented by trehalose has not yet been clarified, but may be as follows: trehalose covers the surface of the green tea; the green tea covered with trehalose scarcely undergoes oxidation, so that the green tea is prevented from discoloration.

It is particularly preferable to blend the green tea component with trehalose and maltose by the following method: steamed leaf is immersed in an aqueous trehalose solution immediately after the steaming step, or an aqueous trehalose solution is thoroughly sprayed over fresh leaf in the presence or absence of steam, thereby impregnating the tea leaf with the trehalose; this tea leaf is dried, and powdered; the powdered green tea obtained is then mixed with maltose.

(4) Properties of Molding Matter

Shape

The above-described green tea composition can be made into molding matter in a variety of shapes such as tablets, plates, bars, balls, and cubes by molding the green tea composition placed in various molds that are used for tableting presses, food shaping presses, and the like. Of these shapes, tablets having diameters of 3 to 15 mm, particularly 6 to 12 mm are preferred from the viewpoint of hardness.

Hardness

It is preferable that the hardness of the molding matter of a green tea composition of the present invention be generally from 3 to 10 kg/cm$^2$, particularly from 4 to 6 kg/cm$^2$. As long as the molding matter has the above hardness, it shows sufficiently high shape retention, can readily be crunched, is highly degradable, and is readily soluble in water or tepid water.

[III] Process for Producing Green Tea Composition (1) Raw Material

Fresh Tea Leaf

Tea leaves plucked from tea plants by hand, or with shears or mechanical harvesting equipment are used as the fresh tea leaf in the process for producing a green tea composition of the present invention. The fresh tea leaf may contain leafstalks.

In general, tea leaves harvested in the months of May to September are used as the fresh tea leaf. However, tea leaves harvested at the beginning of May, the first tea of the season, are usually used to make sencha of high grade, so that they are expensive. Therefore, in the present invention, the use of such tea leaves is not advantageous from the economical point of view. The first tea contains a large amount of amino acids but only a small amount of catechins. As compared with the first tea, those tea leaves harvested in summer (in August and September), called bancha contain a large amount of catechins, so that they are advantageous from the pharmacological point of view. Moreover, these tea leaves are inexpensive, so that the use of these leaves is also advantageous from the economical point of view.

(2) Heat Treatment

By subjecting the fresh tea leaf to heat treatment, that is, steaming in a steamer or parching in a kiln, the enzymes contained in the fresh leaf are inactivated, and the grassy smell of the fresh leaf is removed. Moreover, the fresh leaf is evenly and uniformly softened, so that it becomes easy to conduct the subsequent rolling step. Specifically, the heat treatment can be carried out in either one of the following manners: (a) low-pressure saturated steam generated by a boiler is introduced to the fresh leaf placed in a steamer to bring a large quantity of the heating steam into contact with the leaf, thereby efficiently heating the leaf in a short time; and (b) the fresh leaf is placed in a kiln, and parched with agitation while heating the kiln from the outside thereof. Of these two manners, manner (a) is preferred.

(A) Steaming Step

The above-described steaming is conducted by applying, to the fresh leaf, heating steam at a temperature of 95° C. or more, preferably at a temperature between 97° C. and 100° C. for 20 seconds or more, preferably from 30 seconds to 3 minutes. To inactivate chlorophyll oxidase contained in the fresh leaf, it is enough to maintain the temperature of the leaf at 95° C. for 20 seconds. In general, however, the steaming of the leaf is conducted for a period of approximately 30 seconds to 2 minutes. The standard steaming time for producing gyokuro or sencha is generally from 30 to 40 seconds; the steaming time is made shorter when the flush of a tea shoot is used, while it is made longer when hard leaf is used. The steaming time for producing fukamushicha is generally from 1 to 2 minutes.

(B) Parching Step

The above-described parching in which the fresh leaf placed in a kiln is parched with agitation is generally conducted while heating the kiln from the outside thereof to maintain the surface temperature of the kiln at 300 to 330° C. The inactivation of chlorophyll oxidase contained in the fresh leaf is generally conducted by heating the leaf placed in a kiln at a temperature of 80 to 100° C. for approximately 12 minutes. This leaf is then taken out from the kiln, left for approximately 1 hour, and heated again for drying in the same kiln at a temperature of 60 to 80° C.

(C) Cooling Step

The tea leaf that has been subjected to the above-described heat treatment, that is, steaming or parching, in order to make its green color unchangeable tends to undergo browning at high temperatures due to oxidation. The heat-treated leaf should therefore be cooled down immediately. In general, the heat-treated leaf is cooled to a temperature of 10 to 25° C.

(3) Trehalose Treatment

To impregnate the tea leaf with trehalose by bringing them into contact with each other, it is necessary that trehalose be in the form of a liquid or mist. The treatment with trehalose can be conducted before or after or simultaneously with the heat treatment of the tea leaf. It is preferable to conduct this treatment either after or simultaneously with the heat treatment.

(A) Method in which Tea Leaf is Immersed in Aqueous Trehalose Solution

A simplest method for impregnating the tea leaf with trehalose by bringing them into contact with each other is that the steamed leaf is immersed in an aqueous trehalose solution. This method is preferred because it can fully attain the contact between the tea leaf and trehalose.

Preparation of Aqueous Trehalose Solution

An aqueous trehalose solution for use in the above-described method can easily be prepared by adding water to water-soluble trehalose, and stirring the mixture. In general, the aqueous trehalose solution is prepared so that its trehalose concentration will be from 5 to 50% by weight, preferably from 10 to 40% by weight, more preferably from 20 to 30% by weight. When the aqueous trehalose solution has a lower trehalose concentration, the tea leaf is impregnated with trehalose more easily. It is difficult to impregnate the tea leaf with a thick aqueous trehalose solution because dehydration tends to occur.

Conditions of Trehalose Treatment

The above-described treatment with trehalose is generally conducted at a temperature between 10° C. and 35° C., preferably at a temperature between 20° C. and 25° C., particularly at room temperature for 0.5 to 5 hours, preferably 2 to 3 hours.

(B) Method in which Aqueous Trehalose Solution is Sprayed over Tea Leaf

This method is that the above-described aqueous trehalose solution is sprayed over the steamed tea leaf. Specifically, an aqueous trehalose solution having substantially the same trehalose concentration as that in the above-described method (A) is sprayed over the steamed leaf with agitation.

(C) Method in which Heat Treatment and Trehalose Treatment are Simultaneously Conducted The heat treatment and the trehalose treatment can be conducted at the same time by allowing trehalose to exist in the fresh-leaf-heating zone. Specifically, this can be attained by one of the following methods: (1) a method in which an aqueous trehalose solution is fed to the fresh-leaf-heating zone; (2) a method in which an aqueous trehalose solution is introduced to fresh leaf just before feeding the leaf to the heating zone; (3) a method in which an aqueous trehalose solution is introduced to the hot tea leaf exiting from the heating zone; and (4) a method in which heating steam containing trehalose is introduced to the fresh-leaf-heating zone. Of these, methods (2) and (4) are preferred.

In this method, the heat treatment is conducted in the following manner: low-pressure saturated steam generated by a boiler is mixed with an aqueous trehalose solution so that the trehalose content of the mixture will be from 5 to 50% by weight, and this trehalose-containing steam is then brought into contact with the tea leaf placed in a steamer.

The leaf is steamed for 20 seconds or more, preferably from 30 seconds to 3 minutes while maintaining the inside temperature of the steamer at 95° C. or more, preferably at 97 to 100° C. The standard steaming time for producing gyokuro or sencha is generally from 30 to 40 seconds. The steaming time is made shorter when the flush of a tea shoot is used, while it is made longer when hard leaf is used. Tea leaves harvested in summer or autumn are therefore steamed for 1 to 2 minutes to obtain sencha. The steaming time for producing fukamushicha is generally from 1 to 3 minutes.

This method in which the heat treatment and the trehalose treatment are simultaneously conducted is preferred. This is because since the fresh leaf is steamed with mechanical agitation, and softened, the leaf is effectively brought into contact with trehalose; it thus becomes easy to impregnate the tea leaf tissue with trehalose. In addition, since the heating treatment and the trehalose treatment are conducted at the same time, the production process is to include a decreased number of steps. This method is thus advantageous also from the economical point of view.

(4) Rolling Step (Momi Step)

In the rolling step, the tea leaf is rolled in a hot-air environment with agitation. In the course of this step, moisture is evenly distributed over the leaf, and the leaf is efficiently dried. The rolling step is subdivided into the below-described four steps (A) to (D). Although it is preferable to conduct all of these steps, a part of or all of these steps may be omitted, if necessary.

(A) First Rolling Step (Sojuu Step : Coarse-Rub Step)

The tea leaf that has been brought into contact with trehalose is lightly rolled with agitation to evenly distribute moisture over the leaf, and to efficiently dry and stiffen the leaf. By this rolling step, the moisture content of the leaf is decreased from 75 to 80% by weight to approximately 50% by weight.

(B) Second Rolling Step (Juunen Step: Rub-Twist Step)

This step in which the rolled leaf from the above first rolling step is rolled with a twisting action is conducted for the purposes of further rolling the leaf, and more evenly distributing moisture over the leaf. The second rolling step is generally conducted for 15 to 20 minutes.

(C) Third Rolling Step (Chuujuu Step: Main-Rub Step)

In this third rolling step, the tea leaf from the second rolling step is rolled in a hot-air environment as in the first rolling step. In this step, the temperature of the tea leaf is maintained at 36° C.±2° C. Since the moisture content of the tea leaf from the second rolling step is not so high, this step is effected under relatively mild conditions. The third rolling step is generally conducted for 30 to 40 minutes. By this step, the moisture content of the leaf is decreased from 50% by weight to approximately 26% by weight.

(D) Final Rolling Step (Seijuu Step: Precise-Rub Step)

In the final rolling step, the tea leaf is vigorously rolled, and made into a straight, needle-like shape. The tea leaf from the third rolling step is placed on an arc-shaped plate having a roughened surface, and rolled with a reciprocating rolling blade while heating the plate from its bottom. High pressure is applied to the leaf when it comes between the plate and the rolling blade, whereby the leaf is shaped as desired. In general, this rolling step is effected for 30 to 40 minutes. By this step, the moisture content of the tea leaf is decreased from 26% by weight to approximately 12% by weight.

(5) Drying Step

After the above-described final rolling step is completed, the rolled tea leaf is gradually dried in a drying room into which hot air is blown, until the moisture content of the tea leaf is decreased to approximately 5% by weight. It is preferable that the tea leaf be dried under vacuum, particularly in a vacuum drying room at a reduced pressure of 460 mm/$H_2O$ at a temperature of 40 to 50° C. This drying step is generally conducted for approximately 8 to 10 hours. By this step, the moisture content of the tea leaf is decreased to approximately 4 to 5% by weight.

(6) Granulating Step

The tea leaf that has been dried in the above drying step is cut into a proper size, and then sieved to obtain granulated tea leaf.

(7) Powdering Step

The above-obtained granulated tea leaf may further be crushed into a powder. The powdering step is conducted until the granulated leaf becomes a powder having a particle size of generally not more than 16 meshes (sieve opening: approximately 1 mm or less), preferably from 32 to 200 meshes (sieve opening: approximately 0.5 to 0.07 mm), particularly from 60 to 100 meshes (sieve opening: approximately 0.25 to 0.15 mm). The powdered tea thus obtained can be made into molding matter in a variety of shapes such as tablets. The above-described granulating step and powdering step may be omitted in the case where a green tea composition of sencha is produced.

[IV] Production of Molding Matter of Green Tea Composition (1) Production of Green Tea Composition (A) Granulated or Powdered Green Tea (Component (A))

(a) Green Tea

In the production of a molding matter of a green tea composition of the present invention, granulated or powdered green tea obtained in the following manner is used: fresh leaf plucked from tea plants by hand, or with shears or mechanical harvesting equipment is steamed generally at a temperature of 95° C. or more, preferably at a temperature between 97° C. and 100° C. for 20 seconds or more, preferably for 30 seconds to 3 minutes, and the steamed leaf is rolled, dried, and then granulated or powdered; or the steamed leaf is dried, and then granulated or powdered (cutting, sieving and crushing). Alternatively, the green tea composition as described in the previously mentioned "[I] Green Tea Composition" or "[III] Process for Producing Green Tea Composition" may be used. Of these granulated or powdered green teas, the green tea composition described in the aforementioned "[I] Green Tea Composition" or "[III] Process for Producing Green Tea Composition", that is, a green tea composition comprising 100 parts by weight of green tea leaf, and 0.01 to 30 parts by weight of trehalose is preferred. To shape the above-described green tea composition, or granulated or powdered green tea into molding matter in various shapes, it is essential to blend the granulated or powdered green tea (component (A)) with maltose (component (B)) and trehalose (component (C)) in the proportions that will be described later.

As mentioned above, it is preferable to use, as the granulated or powdered green tea, the green tea composition described in the aforementioned "[I] Green Tea Composition" or "[III] Process for Producing Green Tea Composition". In this case, a molding matter can be obtained by simply adding maltose (component (B)) to the granulated or powdered green tea composition (component (A)), which has been treated with trehalose (component (C)).

(b) Granule or Powder

Granulated or powdered green tea having a particle size of generally not more than 16 meshes (sieve opening: approximately 1 mm or less), preferably from 32 to 200 meshes (sieve opening: approximately 0.5 to 0.07 mm), particularly from 60 to 100 meshes (sieve opening: approximately 0.25 to 0.15 mm) is used for producing a molding matter of a green tea composition of the present invention. As long as the particle size of the granulated or powdered green tea falls within the above-described range, the discoloration-preventing effect of trehalose can fully be obtained.

(B) Maltose (Component (B))

Maltose (component (B)) for use in the production of a molding matter of a green tea composition of the invention is saccharide composed of two molecules of pyranose-type D-glucose that are bonded together through a-1,4-bonding. In the present invention, it is preferable to use, as the maltose component, reducing maltose having a free aldehyde or ketone radical.

In the case where saccharide other than maltose, such as fructose or lactose, is used instead of maltose, it is necessary to use the saccharide in an increased amount and the green tea in a decreased amount so that the resulting molding matter can have sufficiently high shape retention. However, if the saccharide is used in an increased amount, the resulting molding matter gives unfavorable sweetness and taste, and cannot give the taste characteristic of green tea.

(C) Trehalose (Component (C))

In the production of a molding matter of a green tea composition of the invention, the same trehalose as that has been used in the previously-mentioned trehalose treatment is used as the trehalose component (component (C)), as needed. In the case where granulated or powdered green tea that has not been subjected to the trehalose treatment is used as component (A), trehalose (component (C)) is added in an amount in the range that will be described hereinafter. On the other hand, in the case where trehalose-treated granulated or powdered green tea is used as component (A), if the amount of the trehalose with which the green tea has been impregnated has already reached to the upper limit of the below-described range, it is not necessary to add trehalose to the green tea any more. However, if the amount of the trehalose with which the granulated or powdered green tea has been impregnated has not yet reached to the upper limit of the below-described range, trehalose may additionally be added to the green tea in such an amount that the total amount of trehalose will fall within the below-described range.

Trehalose, which is added in order to prevent the green tea from undergoing oxidative deterioration, cannot impart sufficiently high shape retention to the resulting compact when it is used singly. However, when trehalose is allowed to exist together with maltose, the resulting molding matter of a green tea composition can have sufficiently improved shape retention.

(D) Formulation

To obtain a green tea composition that will be made into a molding matter, 35 to 80% by weight, preferably 45 to 70% by weight, particularly 55 to 65% by weight of the granulated or powdered green tea (component (A)) is blended with 10 to 60% by weight, preferably 20 to 50% by weight, particularly 30 to 40% by weight of maltose (component (B)), and 1 to 20% by weight, preferably 3 to 15% by weight, particularly 5 to 10% by weight of trehalose (component (C)). When the percentage of the maltose is too low, the green tea composition cannot be made into a molding matter; or even if a molding matter can be obtained, it is easily collapsed. On the other hand, when the percentage of the maltose is too high, the resulting molding matter predominantly gives the sweetness of maltose, and cannot give the taste characteristic of green tea. When the percentage of the trehalose is too low, the resulting molding matter cannot retain its shape. On the other hand, when the percentage of the trehalose is too high, the resulting molding matter becomes too sweet, and cannot give the taste characteristic of green tea.

(2) Production of Molding Matter of Green Tea Composition (A) Process for Molding By molding the above-described green tea composition placed in various molds for tableting presses, food shaping presses, and the like, there can be obtained molding matter of the green tea composition in a variety of shapes such as tablets, plates, bars, balls and cubes. It is preferable to make the molding matter by a direct molding method in which the green tea composition, or a powdery mixture prepared by uniformly mixing the green tea composition and other additives properly selected from excipients, binders, lubricants and disintegrating agents is directly subjected to molding.

In general, it is preferable to incorporate the above lubricants in an amount of 2.0 to 8.0% by weight, particulary about 1.0 to 5.0 parts by weight for 100 parts by weight of the green tea composition.

(B) Conditions of Molding

The molding of the green tea composition is generally conducted at a temperature between 0° C. and 30° C., preferably between 5° C. and 25° C., particularly between 10° C. and 20° C., by applying a pressure of generally 350 kg/cm² or more, preferably from 400 to 500 kg/cm², particularly from 450 to 500 kg/cm².

EXAMPLES

The present invention will now be explained more specifically by referring to the following Examples and Comparative Examples.

[I] Methods of Measurement (1) Green Color Index Number

The green color index numbers of the green tea compositions prepared in the following examples were measured with a digital color sensor Model CZ-V1, manufactured by Kiensu Kabushiki Kaisha, Japan under the following conditions:

Light Source

Color: Green-colored LED

Type: CZ-40

Distance between light source and sample: 60 mm

Angle between light source and sample at sensor head: 90 degrees

Spot size: 6 mm

Measuring time: from 0.5 to 1 minute

Standard Color: the color of fresh tea leaf right after harvest (1000)

Mode of measurement: stationary

Sample container: glass-made laboratory dish

Samples: the green tea compositions right after production, and after 1 month and 2 months preservation in a thermostatic chamber at 40° C.

(2) Moisture Content

The moisture contents of the green tea compositions were measured in accordance with the process for measuring loss in weight of crude drugs on drying, prescribed in the Japanese Pharmacopoeia.

(3) Content of Catechins

The contents of catechins in the green tea compositions were measured by the use of an enzyme-multiplied immunoassay kit manufactured by Yanaihara Kenkyujo Kabushiki Kaisha, Japan. The content of catechins is obtained as the total of gallocatechin gallate (GCG), epigallocatechin gallate (EGCG) and epicatechin gallate (ECG).

(4) Hardness

The molding matter of the green tea compositions were evaluated in terms of hardness in accordance with the method prescribed in the Japanese Pharmacopoeia, in which a tablet-breaking pressure is measured with a hardness tester. A tablet hardness digital tester ERWEKA (measuring range: 0~30 kg/cm²) was used for this measurement.

(5) Degree of Sweetness

The degrees of sweetness of the molding matter of the green tea compositions were determined relative to the degree of sweetness of 100% sugar, which is presented as 100, by multiplying the percentage of the particular saccharide used and the degree of sweetness thereof. The degrees of sweetness of the saccharides (100%) used in the following examples are as follows:

Sugar: 100

Reducing maltose: 80

Trehalose: 45

Fructose: 173

Lactose: 17

[II] Examples & Comparative Examples

Example A-1

(1) Fresh Tea Leaf 100 kg of tea leaf ("bancha") harvested by using mechanical harvesting equipment in summer (from late in August to early in September) in the area of Sagara-cho, Haibara-gun, Shizuoka-ken, Japan was used as raw material. The moisture content of this fresh leaf was found to be 78% by weight.

(2) Steaming Step

By the use of a boiler manufactured by Hirano Tekko, Japan, and a 30.3 cm wide steamer of speed-controlled conveyor type, manufactured by Suzuki Tekko, Japan, the above fresh leaf was steamed at a temperature of 100° C. for 90 seconds to inactivate the enzymes contained in the leaf. The moisture content of the steamed leaf was found to be 78% by weight.

(3) Cooling Step

By the use of a cooling apparatus of speed-controlled conveyor type, manufactured by Miyamura Tekkosho, Japan, the steamed leaf was cooled to room temperature over 2 minutes.

(4) Trehalose Treatment

The steamed leaf that had been cooled was immersed, at room temperature for 2 hours, in a 27.5 wt. % aqueous solution of trehalose prepared by dissolving 5.5 kg of trehalose ("TREHA™" manufactured by Hayashibara Company, Ltd., Japan) in 14.5 liters of water, while agitating the leaf in such a degree that the leaf tissue was not broken. The moisture content of the trehalose-treated tea leaf was found to be 78% by weight.

(5) Rolling Step

By the use of a rolling machine Model 120, manufactured by Kawasaki Kiko, Japan, the trehalose-treated leaf was lightly rolled and dried for 40 to 45 minutes while blowing hot air at a temperature of 50 to 70° C. The moisture content of the rolled leaf was found to be 50% by weight.

(6) Drying Step

By the use of a vacuum dryer Model MAS-2420, manufactured by Yamamasu Seisakusho, Japan, the rolled leaf was dried under a reduced pressure of 450 mm/H2O (maximum) over 8 hours while blowing hot air at a temperature of 45 to 50° C. into the vacuum dryer.

(7) Crushing Step

The dried leaf was crushed into a powder having a particle size of not more than 60 meshes by the use of a collision-type air crusher Model PGM 130, manufactured by Japan New Matchic Industry, Japan.

(8) Product

The crushed tea was a powdered green tea having a particle size of 60 to 100 meshes and a green color index number of 950, containing 4 parts by weight of trehalose for 100 parts by weight of the green tea leaf, and 18% by weight of catechins. The moisture content of this tea was found to be 5% by weight.

Example A-2

(1) Fresh Tea Leaf 100 kg of tea leaf ("bancha") harvested by using mechanical harvesting equipment in summer (from late in August to early in September) in the area of Sagara-cho, Haibara-gun, Shizuoka-ken, Japan was used as raw material. The moisture content of this fresh leaf was found to be 78% by weight.

(2) Steaming Step

By the use of a boiler manufactured by Hirano Tekko, Japan, and a 30.3 cm wide steamer of speed-controlled conveyor type, manufactured by Suzuki Tekko, Japan, the above fresh leaf was steamed at a temperature of 100° C. for 90 seconds to inactivate the enzymes contained in the leaf. The moisture content of the steamed leaf was found to be 78% by weight.

(3) Cooling Step

By the use of a cooling apparatus of speed-controlled conveyor type, manufactured by Miyamura Tekkosho, Japan, the steamed leaf was cooled to room temperature over 2 minutes.

(4) Trehalose Treatment

The steamed leaf that had been cooled was immersed, at room temperature for 2 hours, in a 27.5 wt. % aqueous trehalose solution prepared by dissolving 5.5 kg of trehalose ("TREHA™" manufactured by Hayashibara Company, Ltd., Japan) in 14.5 liters of water, while agitating the leaf in such a degree that the leaf tissue was not broken. The moisture content of the trehalose-treated tea leaf was found to be 78% by weight.

(5) Drying Step

By the use of a vacuum dryer Model MAS-2420, manufactured by Yamamasu Seisakusho, Japan, the trehalose-treated leaf was gradually dried at a temperature of 45 to 50° C. over 12 hours under a reduced pressure of 450 mm/H2O by blowing hot air into the dryer. The moisture content of the dried leaf was found to be 5% by weight.

(6) Crushing Step

The dried leaf was crushed into a powder having a particle size of not more than 60 meshes by the use of a collision-type air crusher Model PGM 130, manufactured by Japan New Matchic Industry, Japan.

(7) Product

The crushed tea was a powdered green tea having a particle size of 60 to 100 meshes and a green color index number of 950, containing 4 parts by weight of trehalose for 100 parts by weight of the green tea leaf, and 17% by weight of catechins. The moisture content of this tea was found to be 5% by weight.

Example A-3

(1) Fresh Tea Leaf 100 kg of tea leaf harvested by using mechanical harvesting equipment in autumn (late in September) in the area of Kawane-cho, Haibara-gun, Shizuoka-ken, Japan was used as raw material. The moisture content of this fresh leaf was found to be 78% by weight.

(2) Steaming Step Using Trehalose-Containing Heating Steam

By the use of a low-pressure boiler (steam pressure: not more than 0.5 kgf/cm²) manufactured by Terada Seisakusho, Japan, and an agitator-equipped netting-drum rotary steamer manufactured by Terada Seisakusho, Japan, the above fresh leaf was continuously steamed, and, at the same time, treated with trehalose with agitation under the following conditions:

- number of revolutions of netting drum: from 30 to 50 rpm,
- number of revolutions of shaft of agitator: from 250 to 550 rpm,
- flow rate of tea leaf: 400 kg/hour,
- steaming temperature: 95° C.,
- residence time of tea leaf in steamer: 45 seconds,
- concentration of trehalose: 38% by weight,
- feeding rate of trehalose: from 10 to 11 liters/400 kg,
- trehalose and tea leaf being fed through the same port, and
- trehalose spraying pressure: 0.25 mPa.

(3) Cooling Step

By the use of a cooling apparatus of speed-controlled conveyor type, manufactured by Miyamura Tekkosho, Japan, the leaf from the above step was cooled to room temperature over 2 minutes.

(4) Drying Step

By the use of a vacuum dryer Model MAS-2420, manufactured by Yamamasu Seisakusho, Japan, the leaf from the above cooling step was gradually dried at a temperature of 45 to 50° C. over 12 hours under a reduced pressure of 450 mm/H$_2$O by blowing hot air into the dryer. The moisture content of the dried leaf was found to be 5% by weight.

(5) Crushing Step

The dried leaf was crushed into a powder having a particle size of not more than 60 meshes by the use of a collision-type air crusher Model PGM 130, manufactured by Japan New Matchic Industry, Japan.

(6) Product

The crushed tea was a powdered green tea having a particle size of 60 to 100 meshes and a green color index number of 990, containing 3.4 parts by weight of trehalose for 100 parts by weight of the green tea leaf, and 19% by weight of catechins. The moisture content of this tea was found to be 4% by weight.

(7) Preservation

The powdered green tea was preserved for 2 months, and then its green color index number was measured. As a result, it was found to be 970 as shown in Table 2.

Example A-4

The procedure of Example A-1 was repeated, provided that "(2) Steaming Step" and "(3) Cooling Step" in Example A-1 were replaced by "(2) Firing Step" described below. The results are shown in Table 2.

(2) Firing Step

The above-described fresh leaf was placed in a cast-iron kiln, and fired for 12 minutes with agitation while maintaining the temperature of the leaf at 80 to 100° C., thereby inactivating the enzymes contained in the leaf. The fired leaf was taken out from the kiln, left for approximately 1 hour, and heated again for drying in the same kiln at a temperature of 60 to 80° C.

Comparative Example A-1

The procedure of Example A-1 was repeated, provided that the trehalose treatment in Example A-1 was not carried out. As a result, powdered green tea having a particle size of 60 to 100 meshes, containing 5% by weight of moisture was obtained. This green tea was found to have a green color index number of 850, and to contain 14% by weight of catechins.

Comparative Example A-2

The procedure of Example A-4 was repeated, provided that the trehalose treatment in Example A-4 was not carried out. The results are shown in Table 2.

Comparative Examples A-3 and A-4

The procedure of Example A-1 was repeated, provided that the trehalose used in Example A-1 was replaced with fructose or lactose. The results are shown in Table 1.

TABLE 1

| | Steps in production process, and moisture content of tea leaf after each step | Moisture content of Product (wt, %) | Green color Index number right after production | Green color Index number one marth after production | Green color Index number two marths after production | Content of catechins (wt, %) |
|---|---|---|---|---|---|---|
| Example A-1 | Steaming step(78 wt, %)-cooling step-trehalose treatment step-rolling step (50 wt, %)-drying step-(5 wt, %) -crushing step | 5 | 950 | 930 | 915 | 18 |
| Example A-2 | Steaming step(78 wt, %)-cooling step-trehalose treatment step-drying step-(5 wt, %)-crushing step | 5 | 950 | 925 | 905 | 17 |
| Comparative Example A-1 | Steaming step(78 wt, %)-cooling step-rolling step (50 wt, %)-drying step-(5 wt, %)-crushing step | 5 | 850 | 720 | 670 | 14 |
| Comparative Example A-3 | Steaming step(78 wt, %)-cooling step-fructose treatment step-rolling step (50 wt, %)-drying step-(5 wt, %)-crushing step | 5 | 840 | 705 | 620 | 14 |
| Comparative Example A-4 | Steaming step(78 wt, %)-cooling step-lactose treatment step-rolling step (50 wt, %)-drying step-(5 wt, %)-crushing step | 5 | 860 | 710 | 660 | 15 |

TABLE 2

| | Steps in production process | content in powdered green tea(wt, %) moisture | content in powdered green tea(wt, %) trehalose | Green color Index number right after production | Green color Index number two marths after production |
|---|---|---|---|---|---|
| Example A-3 | Steaming step using trehalose-containing heating steam(95° C., 45 seconds, continuous spraying)-cooling step-rolling step-drying step-crushing step | 5 | 3.6 | 990 | 970 |
| Example A-4 | Firing step(200° C., 12 minutes)-trehalose treatment step(immersion for 2 hours)-rolling step-drying step-crushing step | 5 | 2.7 | 940 | 890 |
| Comparative Example A-2 | Firing step(200° C., 12 minutes)-rolling step-drying step-crushing step | 5 | 0 | 820 | 670 |

Example B-1

(1) Fresh Tea Leaf 100 kg of tea leaf ("bancha") harvested by using mechanical harvesting equipment in summer (from late in August to early in September) in the area of Sagara-cho, Haibara-gun, Shizuoka-ken, Japan was used as raw material. The moisture content of this fresh leaf was found to be 78% by weight.

(2) Steaming Step

By the use of a boiler manufactured by Hirano Tekko, Japan, and a 30.3 cm wide steamer of speed-controlled conveyor type, manufactured by Suzuki Tekko, Japan, the above fresh leaf was steamed at a temperature of 100° C. for 90 seconds to inactivate the enzymes contained in the leaf. The moisture content of the steamed leaf was found to be 78% by weight.

(3) Cooling Step

By the use of a cooling apparatus of speed-controlled conveyor type, manufactured by Miyamura Tekkosho, Japan, the steamed leaf was cooled to room temperature over 2 minutes.

(4) Trehalose Treatment

The steamed leaf that had been cooled was immersed, at room temperature for 2 hours, in a 27.5 wt. % aqueous trehalose solution prepared by dissolving 5.5 kg of trehalose ("TREHA™" manufactured by Hayashibara Company, Ltd., Japan) in 14.5 liters of water while agitating the leaf in such a degree that the leaf tissue was not broken. The moisture content of the trehalose-treated tea leaf was found to be 78% by weight.

(5) Rolling Step

By the use of a rolling machine Model 120, manufactured by Kawasaki Kiko, Japan, the trehalose-treated leaf was lightly rolled and dried for 40 to 45 minutes while blowing hot air at a temperature of 50 to 70° C. The moisture content of the rolled leaf was found to be 50% by weight.

(6) Drying Step

By the use of a vacuum dryer Model MAS-2420, manufactured by Yamamasu Seisakusho, Japan, the rolled leaf was dried under a reduced pressure of 450 mm/$H_2O$ (maximum) over 8 hours by blowing hot air at a temperature of 45 to 50° C. into the dryer. The dried leaf was found to have a moisture content of 5% by weight and a green color index number of 950, and to contain 18% by weight of catechins.

(7) Crushing Step

The dried leaf was crushed into a powder having a particle size of not more than 60 meshes by the use of a collision-type air crusher Model PGM 130, manufactured by Japan New Matchic Industry, Japan.

(8) Preparation of Green Tea Composition 60.0 kg of the above trehalose-treated, powdered green tea having a particle size of 60 to 100 meshes was blended with 39.48 kg of reducing maltose ("Reducing Maltose" manufactured by Hayashibara Company, Ltd., Japan), 0.50% by weight of sucrose fatty acid ester, and 0.02% by weight of calcium carboxymethyl cellulose to obtain 98.60 kg of a green tea composition consisting of 57.00% by weight of the powdered green tea, 37.51% by weight of the reducing maltose, 5.00% by weight of the trehalose, 0.48% by weight of the sucrose fatty acid ester, and 0.02% by weight of calcium carboxymethyl cellulose (CMC).

(9) Production of Molding Matter

By the use of a tableting press Model D-36 (direct compation method), manufactured by Kikusui Seisakusho Kabushiki Kaisha, Japan, at a pressure of 450 kg/cm², the above-prepared green tea composition was made into a tablet having dimensions of 9 mm×6.6 mm and a weight of 335 mg.

(10) Evaluation

The hardness and the degree of sweetness of the tablet obtained were measured by the previously mentioned methods. The results are shown in Table 3.

Examples B-2 and B-3, and Comparative Examples B-1 to B-5

The procedure of Example B-1 was repeated, provided that the step "(8) Preparation of Green Tea Composition" in Example B-1 was replaced by the following step "(8) Preparation of Green Tea Composition":

(8) Preparation of Green Tea Composition"

The above trehalose-treated, powdered green tea having a particle size of 60 to 100 meshes was blended with various components as shown in Table 3 to obtain green tea compositions.

The above-obtained powdered green tea compositions and molding matter thereof according to the present invention did not undergo oxidative discoloration in the course of production, and contain powdered green teas of deep green colors at high concentrations. Thus, the green tea compositions and molding matter thereof contain large amounts of amino acids, caffeine and catechins, so that they show the physiological effects of caffeine (antihypnotic action, diuretic effect, vasodilative effect for improving blood circulation, the effect of promoting the secretion of digestive fluid, and the effect of stimulating the central nervous system to activate cerebral activity), as well as the pharmacological effects of catechins such as antioxidant action, antimicrobial and antiviral actions (antimicrobial action against germs that attack digestive apparatus, antiviral action against influenza virus, antiviral action against bacteria relating to tooth decay), blood-cholesterol-level-controlling effect, antivasopressor action, hypoglycemic effect, antidiabetic action, platelet aggregation inhibitory effect, thrombus formation preventive effect, antineoplastic action, anti-carcinogenic action, detoxifying effect, and deodorizing effect. In addition, they contain large amounts of water-insoluble chlorophylls and fluorine, so that they are effective for preventing foul breath, and for strengthening the tooth surface.

What is claimed is:

1. A green tea composition comprising 100 parts by weight of powdered or granulated green tea leaf having a

TABLE 3

| | | Example | | | | | Comparative Example | | | | |
|---|---|---|---|---|---|---|---|---|---|---|---|
| | | B-1 | B-2 | B-3 | B-1 | B-2 | B-3 | B-4 | B-5 | B-6 | B-7 |
| Formulation | | | | | | | | | | | |
| Powdered green tea (wt. %) | | 57.00 | 57.00 | 55.00 | 60.00 | 80.00 | 80.00 | 55.00 | 55.00 | 57.00 | 57.00 |
| Reducing maltose (wt. %) | | 37.50 | 37.50 | 22.00 | 35.00 | — | 5.00 | 22.00 | 22.00 | — | — |
| Trehalos (wt. %) | | 5.00 | 5.00 | 18.00 | — | 15.00 | 10.00 | — | — | 5.00 | 5.00 |
| Fructose (wt. %) | | — | — | — | — | — | — | 18.00 | — | 37.50 | — |
| Lactose (wt. %) | | — | — | — | — | — | — | — | 18.00 | — | 37.50 |
| Sucrose fatty acid easter (wt. %) | | 0.48 | 3.00 | 3.00 | 3.00 | 3.00 | 3.00 | 3.00 | 3.00 | 3.00 | 3.00 |
| Finely-divided silicon disulfide (wt. %) | | — | 2.00 | 2.00 | 2.00 | 2.00 | 2.00 | 2.00 | 2.00 | 2.00 | 2.00 |
| Calcium carboxymethyl cellulose (wt. %) | | 0.02 | — | — | — | — | — | — | — | — | — |
| Molding to tablet | | good | good | good | poor in shape retention; collapsed | cannot be molded | cannot be molded | poor in shape retention; readily collapsed | poor in shape retention; readily collapsed to give fine partles | poor in shape retention; readily collapsed to give fine partles | poor in shape retention; readily collapsed to give fine partles |
| Evaluation | | | | | | | | | | | |
| Hardness | | 5 good | 5 good | 5 good | — | — | — | 3 slightly weak | 3 slightly weak | 2 weak | 2 weak |
| Degree of Sweetness | | 31.85 good | 32.25 good | 25.70 good | 28.00 | 6.75 | 8.50 bitter | 48.20 too sweet no good | 20.66 slightly bitter | 66.00 too sweet no good | 8.62 bitter |
| green color Index number | right after production | 950 | 950 | 960 | 950 | — | — | 950 | 950 | — | — |
| | two marths after production | 910 | 910 | 920 | 880 | — | — | 880 | 880 | — | — |
| Remarks | | good | good | good | — | — | — | — | The product has the smell of lactose; the taste of green tea spoiled. | — | The product has the smell of lactose; the taste of green tea spoiled | particle size of not more than 16 mesh and a green color index number measured with a digital color sensor of 900 to 1,000, said green color index number representing the amount of residual chlorophyll, and 0.01 to 30 parts by weight of trehalose.

2. A molding matter of a green tea composition, obtained by molding a green tea composition comprising the following components (A), (B) and (C):

component (A): from 35 to 80% by weight of powdered or granulated green tea having a green color index number measured with a digital color sensor of 900 to 1,000, component (B): from 10 to 60% by weight of maltose, and component (C): from 1 to 20% by weight of trehalose.

3. The molding matter of a green tea composition according to claim 2, having a green color index number measured with a digital color sensor of 900 to 1,000.

4. The molding matter of a green tea composition according to claim 2, having a hardness of 3 to 10.

5. The molding matter of a green tea composition according to claim 2, further comprising a lubricant in an amount of 0.2 to 8.0 parts by weight for 100 parts by weight of the green tea composition.

* * * * *